Aug. 2, 1955  V. G. KUVIN  2,714,443
RECEPTACLES FOR DENTURES
Filed Sept. 8, 1951

INVENTOR.
VERNA G. KUVIN
BY
ATTORNEYS

United States Patent Office 2,714,443
Patented Aug. 2, 1955

2,714,443

RECEPTACLES FOR DENTURES

Verna G. Kuvin, Springfield, N. J.

Application September 8, 1951, Serial No. 245,688

1 Claim. (Cl. 206—1)

This invention relates to improvements in receptacles for cleaning or storing artificial dentures.

It is an object of the instant invention to provide a simple and inexpensive receptacle for artificial dentures;

A further object object is to provide a readily cleaned receptacle that will keep two dentures in a highly sanitary condition.

Other objects of the instant invention will become apparent in the course of the following specification.

In the attainment of these objectives, the receptacle is of rectangular cross section and made from any material suitable for containing any known cleaning solution for the dentures. Within the receptacle is a vertically slidable partition for the removable support of a denture on each side so that the hands never come in contact with the solution.

The invention will appear more clearly from the following detailed description when taken in conjunction with the accompanying drawings showing by way of example a preferred embodiment of the inventive concept.

Figure 1:
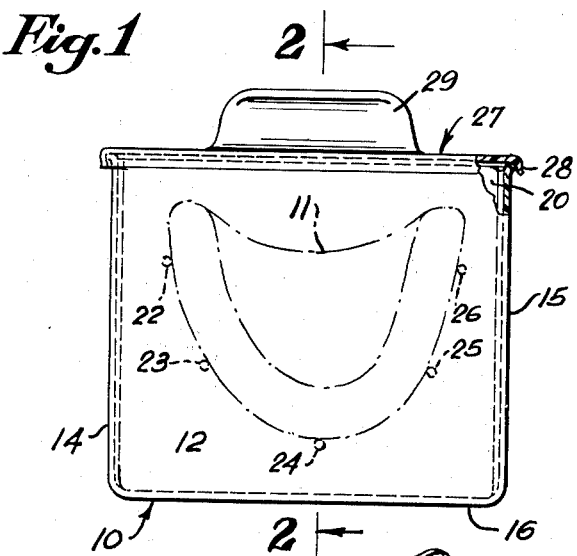
Figure 1 is a side elevational view of the denture receptacle constructed in accordance with the principles of this invention.
Figure 2:
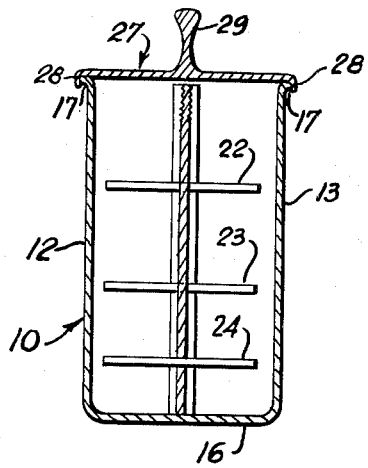
Figure 2 is a sectional view along 2—2 of Figure 1.
Figure 3:
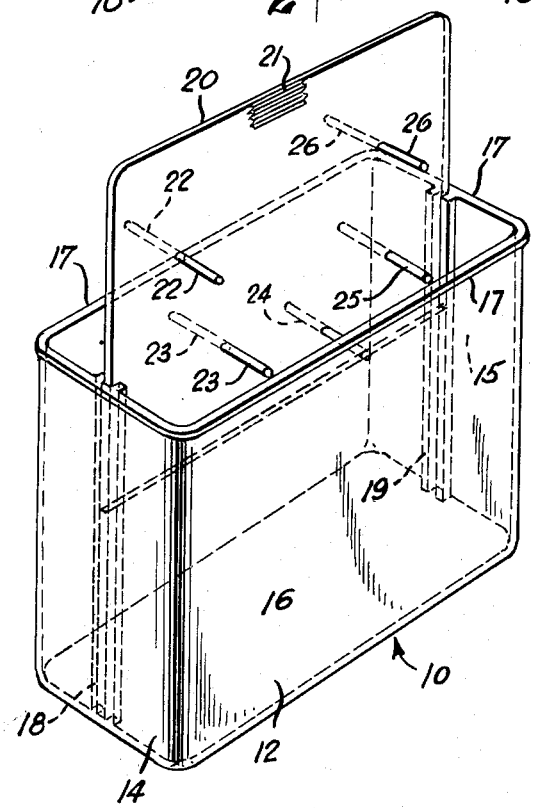
Figure 3 is a view in perspective of the receptacle shown in Figure 1 with the cover removed and the partition for the support of the dentures partially removed.

Referring now in greater detail to the drawings where like reference numerals indicate like parts, reference numeral 10 indicates the receptacle, and 11 a denture.

The receptacle 10 is formed with the spaced parallel front and back members 12 and 13 and the spaced parallel end members 14 and 15, all of which members may be formed from any material and may be integrally formed along corresponding edges. A bottom member 16 is integrally formed along the corresponding edges of the other members.

Around the periphery of the open top of the receptacle is an outwardly directed bead 17 while on the inner surfaces of the end members 14 and 15 are the aligned vertical slideways 18 and 19.

Slidable in the slideways 18 and 19 and removable through the open top of the container is a partition 20 for the removable support of the denture 11, the partition having a roughened portion 21 to serve as a finger grip when moving the partition via the slideways in and out of the open top of the receptacle. The partition 20 further has a plurality of spaced pegs 22, 23, 24, 25, and 26 which are arranged in downwardly directed arcuate form as illustrated for the removable support of the denture 11. The arrangement of the pegs is such that a denture of any size can be supported. It will be noted also that the pegs pass through the partition so that a denture can be supported on both sides thereof.

Over the open top of the receptacle 10 is a cover member 27 around the periphery of which is the downwardly directed flange 28 coacting with the bead 17 to make the receptacle liquid tight when in position. By making the front and back and end and cover members from a material of sufficient resilient qualities and employing a close tolerance, a very substantial and inexpensive seal is provided. To facilitate the manipulation of the cover, a handle member 29 may be integrally formed with the top surface of the cover member or may even be otherwise attached thereto.

In operation, after the cover member 27 and the partition 20 are removed, the receptacle is partially filled with any known solution suitable for cleaning dentures. Then, the partition 20 may be partially reinserted and one denture placed on each side thereof, the front of the denture extending downwardly as shown in Figure 1. Next, the partition is pushed downwardly in the solution until the dentures are completely immersed and the top of the partition is slightly below the open top of the receptacle for the replacement of the cover member. If required, more solution can be added on both sides of the partition or, since the partition and slideways form no seal, the solution may be added only on one side. The resiliency of the material used together with the design of the bead 17 of the receptacle and the flange of the cover member 27 provide a substantial seal at low cost.

It will be apparent that the denture receptacle hereinbefore described is subject to many variations and modifications within the scope of the appended claim.

What is claimed is:

A denture receptacle, comprising an elongated container having spaced parallel front and back members, spaced parallel end members disposed along corresponding edges of said front and back members, a bottom member disposed along the corresponding edges of said front, back and end members, and an open top, said container adapted to contain a denture cleaning liquid, opposed slideways on the inner surfaces of said end members substantially in the middle thereof, a partition extending into the container and having side edges fitting in said slideways, denture support means carried by said partition and projecting on opposite sides thereof substantially perpendicularly to the plane of the partition, said support means being spaced along inverted arches defining the outlines of dentures to support separate dentures on opposite sides of said partition and within said container and gripping means mounted at the top portion of said partition for sliding said partition upwardly for removal of said dentures from said receptacle.

References Cited in the file of this patent

UNITED STATES PATENTS

| 258,720 | Dickson | May 30, 1882 |
| 448,548 | Schifferly | Mar. 17, 1891 |
| 727,938 | Hall | May 12, 1903 |
| 1,313,865 | Hahn | Aug. 19, 1919 |
| 1,456,401 | Powell | May 22, 1923 |
| 2,122,583 | Parizot | July 5, 1938 |
| 2,316,632 | Smart | Apr. 13, 1943 |
| 2,605,187 | Stiehm | July 29, 1952 |